US006275767B1

(12) United States Patent
Delseny et al.

(10) Patent No.: US 6,275,767 B1
(45) Date of Patent: Aug. 14, 2001

(54) METHOD FOR IMPLEMENTING AN AIR TRAFFIC SERVICE UNIT

(75) Inventors: Hervé Delseny, Fonsorbes; Serge de Viguerie; Famantanantsoa Randimbivololona, both of Toulouse; Jean Souyris, Damiatte, all of (FR)

(73) Assignee: Aerospatiale Matra, Paris (FR)

( * ) Notice: Subject to any disclaimer, the term of this patent is extended or adjusted under 35 U.S.C. 154(b) by 0 days.

(21) Appl. No.: 09/456,434

(22) Filed: Dec. 8, 1999

(30) Foreign Application Priority Data

Dec. 11, 1998 (FR) ..................................................... 98 15690

(51) Int. Cl.[7] ........................................................ G06F 7/00

(52) U.S. Cl. ............................................ 701/120; 701/301

(58) Field of Search ............................ 701/1, 3, 14, 120, 701/200, 205, 208, 300, 301

(56) References Cited

U.S. PATENT DOCUMENTS

| | | | |
|---|---|---|---|
| 4,943,919 * | 7/1990 | Aslin et al. | 701/3 |
| 5,541,863 * | 7/1996 | Magor et al. | 701/14 |

FOREIGN PATENT DOCUMENTS

| | | |
|---|---|---|
| 0653824 A1 | 5/1995 | (EP) . |
| 0751594 B1 | 1/1997 | (EP) . |
| 2748145 | 10/1997 | (FR) . |

OTHER PUBLICATIONS

Hiroshi Yokosuka, et al. "Multifiber Optical Components for Subscriber Networks", 1996 Electronic Components and Technology Conference, pp. 487–493.

M. Mermilliod, B. Francois, et al., "$LaMgAl_{11}$ $O_{19}$ : Nd microchip laser", 1991 American Institute of Physics. pp. 3519–3520.

Britten, P.D., et al., "Implementation of OSI Compliant Aircraft Communication Systems," Fifth International Conference on Satellite Systems for Mobile Communications and Navigation (Conf. Publ. No. 424), London, UK, May 13–15, 1996, pp. 40–43.

Ubnoske, Michael J., et al., "Use of COTS Software Products to Manage Air Traffic Control Systems," $41^{st}$ Annual Air Traffic Control Assoc. Conference Proceedings, Proceedings of the $41^{st}$ Annual International Program and Exhibition of the Air Traffic Control Assoc., Nashvilee, TN, Oct. 13–17, 1996, pp. 36–40.

Vasudevan, N., et al., "Migrating DSR to a POSIX–Compliant Platfrom: Lessons Learned, " $41^{st}$ Annual Air Traffic Control Assoc. Conference Proceedings, Proceedings of the $41^{st}$ Annual International Program and Exhibition of the Air Traffic Control Assoc., Nashvilee, TN, Oct. 13–17, 1996, pp. 184–189.

* cited by examiner

*Primary Examiner*—William A. Cuchlinski, Jr.
*Assistant Examiner*—Edward Pipala
(74) *Attorney, Agent, or Firm*—Burns Doane Swecker & Mathis L.L.P.

(57) ABSTRACT

This invention relates to a method for implementing the air traffic service unit (ATSU) managing the links between certain aircraft equipment and the ground/board communication means, and its operating system (OS) managing input/output, the use of software and hardware resources, chaining and timing of applications that are programs carrying out aircraft system functionalities, and wherein memory partitioning mechanisms and CPU partitioning mechanisms are used; wherein operating system calls are filtered so as to prevent said AOC (Airline Operational Communication) type applications from distributing the operation of said air traffic service unit.

4 Claims, 3 Drawing Sheets

METHOD FOR IMPLEMENTING AN AIR TRAFFIC SERVICE UNIT

TECHNICAL FIELD

This invention relates to a method for implementing an air traffic service unit.

BACKGROUND ART

In future aircraft generations, a new equipment will come into being: the air traffic service unit or ATSU. It is the object of this air traffic service unit, as described in "AIM-FABS The Airbus Interoperable Modular Future Air Navigation System" (Salon du Bourget, May 1997, Aerospatiale), to manage links between certain aircraft equipment (such as the flight management system (FMS), the central maintenance computer (CMC), the flight warning system (FWS) . . . ) and the ground/board communication means (such as satellite communication (SatCom), the HF data link (HFDL), the aircraft communication addressing and reporting system (ACARS) . . . ).

The special feature of the air traffic service unit is that is has been designed as a conventional computer with an operating system, whereon applications are run. Thus, the conventional architecture represented in FIG. 1 can be recognized.

The operating system 10 manages input/output 11, software 12 and hardware 13 resource use, application 14 chaining and timing: A1 . . . An.

Software resources correspond to sub-routines that can be used by the applications and/or the operating system (communication management, libraries, . . . ).

Hardware resources include memories, busses, registers, a processor, a coprocessor, . . . .

Applications are programs each performing a functionality of the aircraft system, e.g. controller/pilot data link communication (CPDLC).

The job of the air traffic service unit is to increase the aircraft's operational capacities by automating pilot-controller exchanges through the use of data communication networks.

The air traffic service unit supports the basis of the communication and surveillance activities comprised in the general FANS-CNS/ATM concept within the ATIMS system.

The main functions provided by the air traffic service unit are:

- management of the crew/controller dialog (CPDLC/AFN);
- automatic dependent surveillance (ADS);
- aircraft operating functions (AOC), e.g. flight plan modification, maintenance reports, . . . ;
- use of the ACARS network before implementing the ATN network;
- ACARS routing.

In relation to security objectives, the classification of the functions provided by the air traffic service unit requires no particular architecture.

As depicted in FIG. 2, the environment of the air traffic unit is composed of:

- a system 20 giving access to the ACARS air/ground sub-network;
- avionics systems 21, such as:
  - flight management system (FMS),
  - electronic flight instrument system/electronic centralized aircraft monitoring (EFIS/ECAM),
  - central maintenance computer (CMC),
  - flight warning system (FWS),
  - printer,
  - multi-purpose disk drive unit (MDDU),
  - clock;
- display units (MCDU1, MCDU2, MCDU3, . . . );
- a data link control and display unit 22.

FIG. 3 illustrates the software structure of the air traffic service unit with independent software and corresponding load relationships.

FIG. 4 illustrates the functions of the air traffic service unit with their positions for the applications and for the software platform.

The computer of the air traffic service unit consists of two function categories:

- basic functions providing the functional part of this computer;
- system management functions that have no impact on the functional part of the computer. They are to perform the conventional services of any onboard aircraft computer (maintenance, surveillance, etc.).

Among the basic functions, applications can be found. The term "application" refers to an air/ground data link communication protocol and its onboard integration. Each application has the ability required for sequencing the different processes required.

These applications comprise:

- Air traffic service applications or ATC grouping:
  - air traffic management services (ATMS). Such applications support and initialize board/ground and ground/board information exchange, with controller/pilot data link communication (CPDLC) and air traffic facility notification (AFN) being included;
  - the surveillance application (ADS) allowing in particular to specify the aircraft's position continuously;
  - flight information services.
- Airline operational communication or AOC applications.

When the air traffic service unit is delivered, the client airline can implement its own applications, which it has developed in-house or has had developed by a third party. This possibility is very interesting commercially, as such applications enable said airline to use for its own purposes certain data available at aircraft level, which does not relate to aircraft operation as such, but to its use as a commercial tool (duration of certain parts of the flight, fuel consumption, . . . ). These applications, called AOC, are not known to the manufacturer of the air traffic service unit.

The air traffic service unit must be able to accommodate such AOC applications developed by third parties on behalf of airline companies. The constraints associated with such a demand result in a sign-on structure allowing to:

- make the various development phases (completion, debugging and support) as independent as possible;
- make the hardware platform "transparent" for the software;
- ensure processing capacity for each process (CPU time);
- ensure non-disturbance of an ATC application by an AOC application.

The manufacturer of the air traffic service unit must certify the equipment with various official institutions, wherein certifying means: to know, check and ensure the operation of the whole system in all possible operating modes, including defective modes or when certain components are defective. This procedure is known and under control.

Certification has two functions: one purely administrative function corresponding to an approval of use on commercial aircraft, and above all, one security insurance function. Certification makes it possible to ensure that the operation or malfunction of an equipment will have no unacceptable consequences. The admissible malfunction level varies depending on the equipment's functional role in the aircraft: thus, the equipment managing the passengers' individual reading lamps are not subject to the same constraints as a flight command computer. The document entitled "Software Considerations In Airborne Systems And Equipment Certification" (D0-178B/ED-12B, RTCA Inc., December 1992, pp. 28, 60, 69, and 71) illustrates the fact that the software as a whole of an onboard equipment is involved in certification.

Thus, an equipment is obtained, the operation of which is certified (known, checked and guaranteed), whereon an unknown AOC application can be run. Obviously, the new system is not the one that has been certified. To certify it, the certification procedure would have to be redone for the system manufactured, improved by the AOC application(s). Such a procedure would be far too expensive. Moreover, the commercial advantage of offering an airline the possibility of implementing its own applications would be lost.

To minimize the certification procedures for each development, the air traffic service unit implements:

- a modular software design;
- a centralized platform concept;
- high level interfaces between this centralized platform and the applications;
- an application separation.

In order to concentrate the detailed integration/validation and qualification only on the modified/added application, the reduced method is the result of a modification impact analysis when new software (except for AOC applications) is added.

Of course, an initial certification of the air traffic service unit covers all aspects, but the certification of a development of this air traffic service unit must not concentrate on the new modified parts.

It is the object of the invention, in the specific case of AOC applications, not to require any certification, the software of such applications being placed at level E (minimum failure criticality level in relation to the aircraft), and therefore to combine both requirements: certifying the equipment as a whole (i.e. including AOC applications) and allowing airlines to implement their own applications.

Disclosure of the Invention

This invention relates to a method for implementing an air traffic service unit (ATSU) managing links between certain aircraft equipment and the ground/board communication means, and its operating system (OS) managing input/output, the use of software and hardware resources, chaining and timing of applications that are programs carrying out aircraft system functionalities, and wherein memory partitioning mechanisms and CPU partitioning mechanisms are used, said method being characterized by filtering the operating system calls from airline operational communication or AOC applications so as to prevent said applications from disturbing the operation of said air traffic service unit.

Advantageously, filtering is done by the Hook method. This filtering only lets through authorized system calls.

In an advantageous embodiment, system call control software allows:

- configuring filters certain features of which can be set by means of a "superuser" process, of the air traffic service unit;
- filtering system calls that have to be filtered;
- recording system call execution rejects in a specific area;
- at the demand of the superuser process of the air traffic service unit, supplying the data stored on system call rejects.

DETAILED DESCRIPTION OF THE EMBODIMENTS

Figure 1:
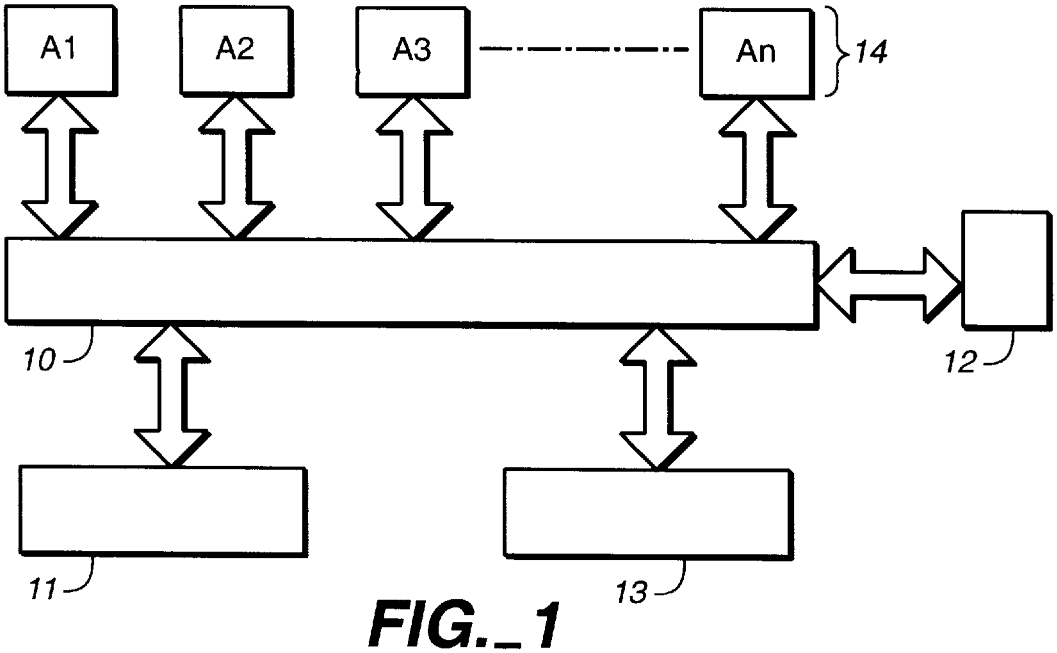
FIG. 1 illustrates the structure of the air traffic service unit.
Figure 2:
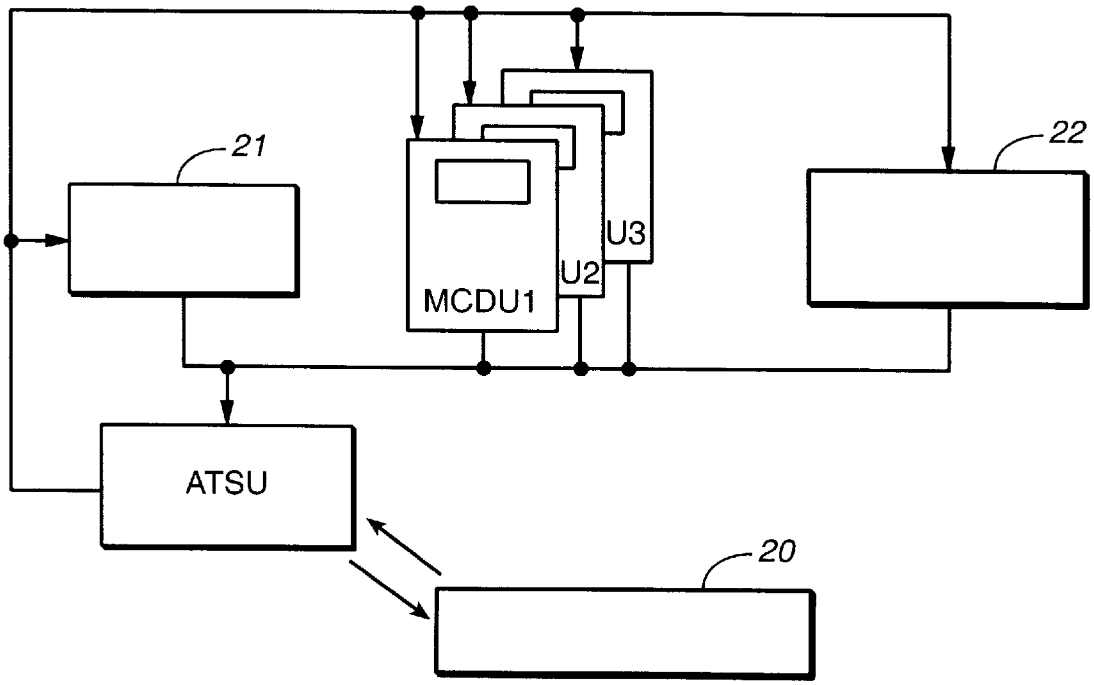
FIG. 2 illustrates the environment of the air traffic service unit.
Figure 3:
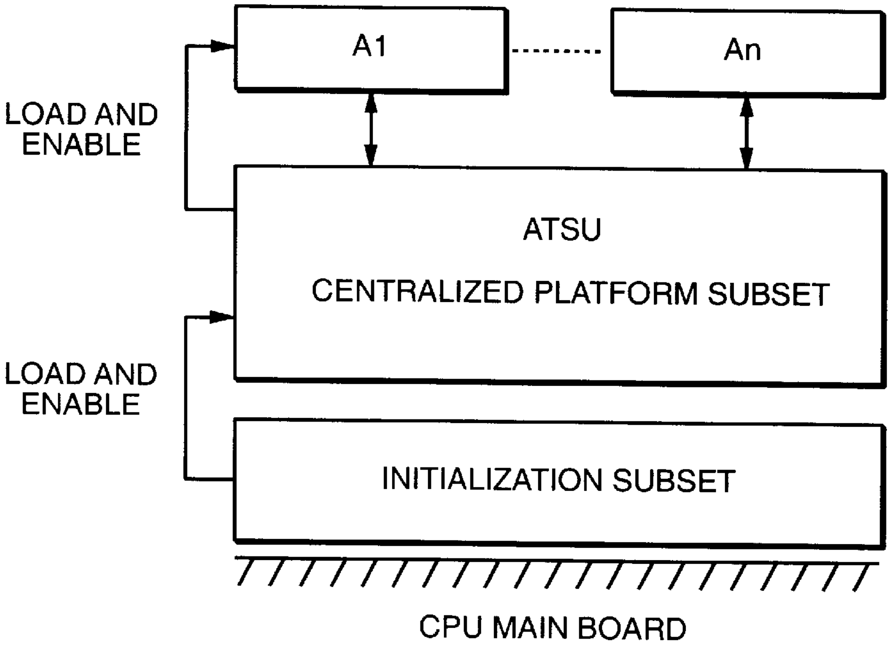
FIG. 3 illustrates the software structure of the air traffic service unit.

This invention relates to a method for implementing the air traffic service unit (ATSU) that manages the links between certain aircraft equipment and the ground/board communication means, and its operating system (OS) managing input/output, the use of software and hardware resources, chaining and timing of applications that are programs carrying out the aircraft system functionalities.

The software architecture of the air traffic service unit is based on using a real-time operating system handling the processes. A software subset is applied to each process.

Each process is protected from other processes through various protection mechanisms, such as:

Memory partitioning

The operating system uses a memory management unit (MMU) of the microprocessor so that two steps are required for translating the logical address of the current code into a physical address:

- logical address→linear address by means of a memory management unit partitioning mechanism;
- linear address→physical address by means of a memory management unit paging mechanism.

During each of these steps, the memory management unit performs a protection check and bars illegal access.

The operating system provides two partitioning types:

- the user code (nonpriviledged) cannot access directly the operating system code or the data space. Only indirect access via operating system calls is possible;
- one process code cannot access another process code or data space.

CPU use partitioning.

Each process can comprise a maximum of four jobs. Each job has a priority that is less or equal to the priority of the process it comes from. The operating system supplies a preemptive priority report together with circular management by priority level. Thus, a low-level job cannot prevent a higher level job from using the CPU and a job cannot monopolize the CPU indefinitely to the detriment of a job having the same priority.

The invention consists in filtering operating system calls from AOC type applications so as to prevent said applications from disturbing the operation of the air traffic service unit.

In order to understand this filter mechanism, we will briefly go back to the operation of the operating system.

When an application needs a software or hardware resource, to communicate with another application or even modify operating system parameters, it must pass through the operating system.

Due to the proper design of the computer, e.g. of UNIX type, the application cannot perform such accesses directly: it performs requests for accessing the operating system by means of a parameterized software interrupt. Parameters define the desired type of access, i.e. the functionality called.

The operating system manufacturer has provided a possibility called HOOK method allowing to launch a procedure during a system call just before the call is processed by the operating system.

The document entitled "Essai SAR OSY001: Agression sur 1' operating system" (LA_2T0_PTV_SA_01C, Aerospatiale, pp. 147–153, 1998) gives two examples of tests carried out on the ATSU software and showing the effect of filtering using the HOOK procedure.

Call filtering is done via a procedure the principle of which results in creating:

a HOOK procedure mechanism in the processing of the operating system call dispatcher;

driver software (code developed by the manufacturer for filtering system calls; table I provided at the end of the specification by way of example, lists the 266 system calls as well as the associated filter type; indeed, the manufacturer proposing as a standard option a core that the user can configure using stubs, mechanisms simulating actual calls without processing). This software, enabled by the HOOK procedure, actually carries out the filtering.

In the HOOK procedure of the system call dispatcher, any system call enables this dispatcher, which ensures the transition with the operating system context and carries out the required system call. This dispatcher is the entry point to the operating system; so, this is where the filter calling HOOK procedure is arranged.

The HOOK procedure is implemented just before dispatching and consists in allowing the activation of a process (similar to part of a driver) checking the feasibility of the system call.

This system call control software allows:

configuring filters certain features of which can be set by means of a "superuser" process, of the air traffic service unit;

filtering system calls that have to be filtered;

recording system call execution rejects in a specific area;

at the demand of the superuser process of the air traffic service unit, supplying the data stored on system call rejects.

Knowing that nothing is known about the operation of the AOC applications and that they cannot be controlled, the object of the invention is a method allowing to prevent such applications from disturbing the rest of the system. Therefore, all AOC application ←→ operating system exchanges are filtered.

Figure 5:
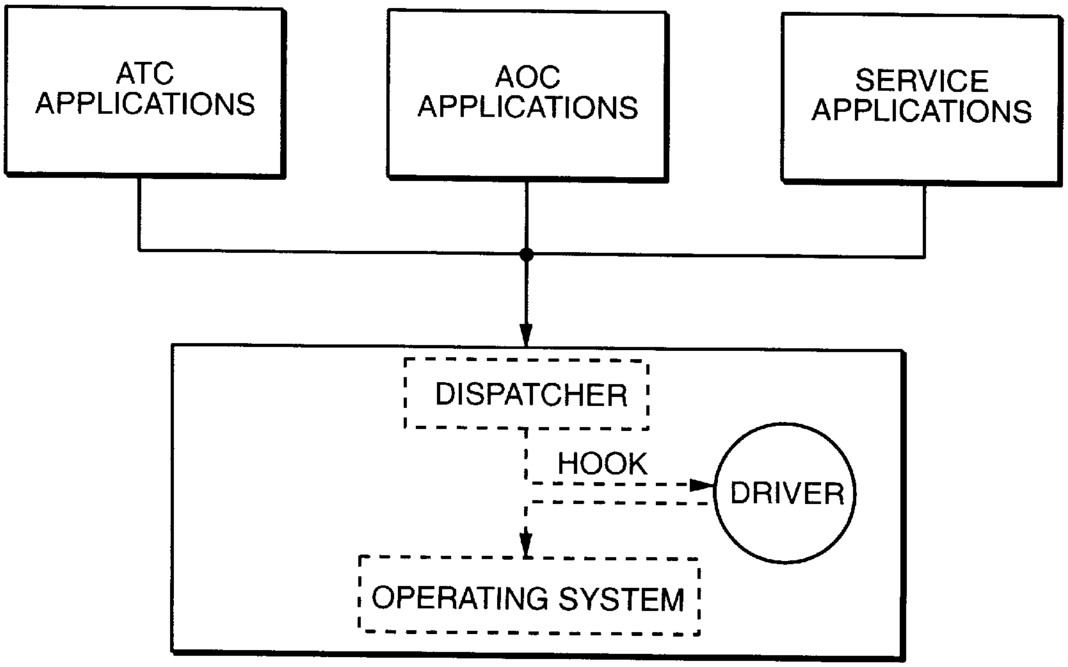
FIG. 5 illustrates the inventive method.
Figure 4:
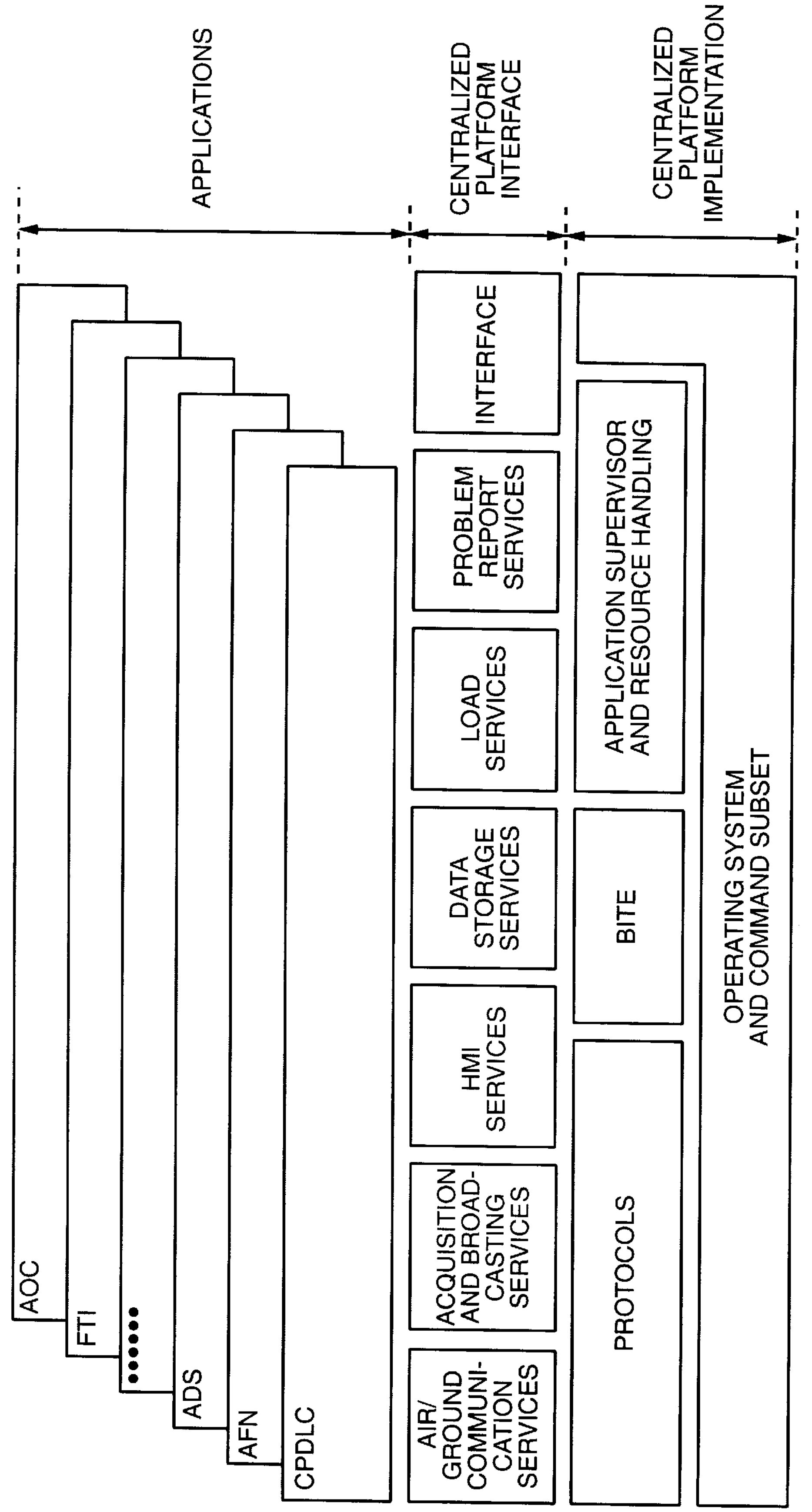
FIG. 4 illustrates the functions of the air traffic service unit.

As illustrated in FIG. 5, the inventive method comprises a procedure filtering, via the HOOK method, the operating system calls from the AOC applications and only authorizing those that have no influence on what is certified. Each possible system call is analyzed and the risk that its uncontrolled use can represent for the system as a whole is determined individually. Each system call is classified into one of three categories: rejected, accepted conditionally or accepted. During a forbidden system call, the HOOK procedure returns a standard message, no action or even terminate calling process.

The operating system thus has a new mechanism that allows to implement at user level a system call control policy, on a call by call basis.

TABLE I

APPENDIX

| No. | Call | Required filter or priviledge control | Type | Implementation details |
|---|---|---|---|---|
| 0 | none | forbidden | H | false |
| 1 | reboot | | | |
| 2 | fork | calling user must be root (administrator) | H[a] | uid==0 |
| 3 | (none)[b] | forbidden | H | false |
| 4 | sbrk | | | |
| 5 | Isbrk | | | |
| 6 | sethostname | calling user must be root | H | uid==0 |
| 7 | gesthostname | calling user must be root | H | uid==0 |
| 8 | kill | | | |
| 9 | _exit | | | |
| 10 | getitimer | | | |
| 11 | setitimer | | | |
| 12 | wait3 | | | |
| 13 | wait | | | |
| 14 | setpriority | calling user must be root or requested priority less than the highest priority defined for the process | H | (uid==0) \| (newprio<=priolim) |
| 15 | getpriority | | | |
| 16 | getpid | | | |
| 17 | getppid | | | |
| 18 | sigvec | | | |
| 19 | sigblock | | | |
| 20 | sigsetmask | | | |
| 21 | sigpause | | | |
| 22 | killpg | | | |
| 23 | read | | | |
| 24 | iocti | | | |
| 25 | Iseek | | | |
| 26 | write | | | |
| 27 | close | | | |
| 28 | open | | | |
| 29 | getrusage | | | |
| 30 | (none)[c] | forbidden | H | false |
| 31 | sync | | | |
| 32 | mkdir | | | |
| 33 | mknod | calling user must be root | H | uid==0 |
| 34 | execve | | | |
| 35 | dup2 | | | |
| 36 | dup | | | |
| 37 | pipe | | | |
| 38 | stat | | | |
| 39 | Istat | | | |
| 40 | fstat | | | |
| 41 | chdir | | | |
| 42 | chmod | | | |
| 43 | fchmod | | | |
| 44 | link | | | |
| 45 | unlink | | | |
| 46 | chroot | | | |
| 47 | fcntl | | | |
| 48 | getdtablesize | | | |
| 49 | fsync | | | |
| 50 | getpgrp | | | |
| 51 | setpgrp | | | |
| 52 | readlink | | | |
| 53 | access | | | |
| 54 | getuid | | | |
| 55 | gettimeofday | | | |
| 56 | umask | | | |
| 57 | settimeofday | | | |
| 58 | rmdir | | | |
| 59 | rename | | | |
| 60 | symlink | | | |
| 61 | mount | | | |
| 62 | unmount | | | |
| 63 | sem_get | forbidden | H | false |
| 64 | sem_count | forbidden | H | false |
| 65 | sem_wait | forbidden | H | false |

TABLE I-continued

APPENDIX

| No. | Call | Required filter or priviledge control | Type | Implementation details |
|---|---|---|---|---|
| 66 | sem_signal | forbidden | H | false |
| 67 | sem_nsignal | forbidden | H | false |
| 68 | sem_reset | forbidden | H | false |
| 69 | sem_delete | forbidden | H | false |
| 70 | smem_create | Only the root user has the right to create shared memories mapped to physical space. Other users only have access to memories the logical name and the access mode of which are specified in a table. Access mode depends on the user and on the group(s) to which he belongs. | H | (uid==0 \| (name in table &&(uid==owner uid&&umode ! = 0) \| (ownergrid in group(process) &&gmode ! = 0) \| (omode ! =0) ) |
| 71 | sem_get | Only the root user has the right to create shared memories mapped on physical space. Other users only have access to memories the logical name and the access mode of which are specified in a table. Access mode depends on the user and on the group(s) to which he belongs. | | (uid==0 \| (name in table &&(uid==owner uid&&umode ! = 0) \| (ownergrid in group(process) &&gmode ! =0) \| (omode ! =0) ) |
| 72 | smem_remove | calling user must be root | H | uid==0 |
| 73 | info | | | |
| 74 | flock | forbidden | H | false |
| 75 | chcdev | | | |
| 76 | dr_install | | | |
| 77 | dr_uninstall | | | |
| 78 | cdv_install | | | |
| 79 | cdv_uninstall | | | |
| 80 | select | | | |
| 81 | getpagesize | | | |
| 82 | getrlimit | | | |
| 83 | setrlimit[d] | | | |
| 84 | bdv_install | | | |
| 85 | bdv_uninstall | | | |
| 86 | setreuid | | | |
| 87 | brk | | | |
| 88 | chown | | | |
| 89 | fchown | | | |
| 90 | utimes | | | |
| 91 | lockf | forbidden | S[e] | stub lockf |
| 92 | geteuid | | | |
| 93 | getgid | | | |
| 94 | getegid | | | |
| 95 | setregig | | | |
| 96 | getgroups | | | |
| 97 | setgroups | | | |
| 98 | truncate | | | |
| 99 | ftruncate | | | |
| 100 | mkcontig | forbidden | H | false |
| 101 | msgctl | destruction forbidden if user not root | H | (uid==0) \| (cmd ! = IPC_RMID) |
| 102 | msgget | creation forbidden if user not root | H | (uid==0) \| ( (flag&IPC_CREAT) ==0) |
| 103 | msgrcv | | | |
| 104 | msgsnd | | | |
| 105 | readv | | | |
| 106 | writev | | | |
| 107 | socket | calling user must be root | S | uid==0 |

TABLE I-continued

APPENDIX

| No. | Call | Required filter or priviledge control | Type | Implementation details |
|---|---|---|---|---|
| 108 | connect | calling user must be root | S | uid==0 |
| 109 | bind | calling user must be root | S | uid==0 |
| 110 | listen | calling user must be root | S | uid==0 |
| 111 | accept | calling user must be root | S | uid==0 |
| 112 | shutdown | calling user must be root | S | uid==0 |
| 113 | sysi86 | forbidden | H | false |
| 114 | plock | | | |
| 115 | semget | creation forbidden if user not root | H | (uid==0) \| ( (flag&IPC_CREAT) ==0) |
| 116 | semctl | destruction forbidden if user not root | H | (uid==0) \| (cmd ! =IPC_RMID) |
| 117 | semop | | | |
| 118 | shmctl | destruction forbidden if user other than root | H | (uid==0) \| (cmd ! =IPC_RMID) |
| 119 | shmget | creation forbidden if user other than root | H | (uid==0) \| ( (flag&IPC_CREAT) ==0) |
| 120 | shmat | | | |
| 121 | shmdt | | | |
| 122 | sigpending | | | |
| 123 | waitpid | | | |
| 124 | ptrace | calling user must be root | H | uid==0 |
| 125 | send | calling user must be root | S | uid==0 |
| 126 | sendto | calling user must be root | S | uid==0 |
| 127 | sendmsg | calling user must be root | S | uid==0 |
| 128 | recv | calling user must be root | S | uid==0 |
| 129 | recvfrom | calling user must be root | S | uid==0 |
| 130 | recvmsg | calling user must be root | S | uid==0 |
| 131 | setsockopt | calling user must be root | S | uid==0 |
| 132 | getsockopt | calling user must be root | S | uid==0 |
| 133 | getsockname | calling user must be root | S | uid==0 |
| 134 | getpeername | calling user must be root | S | uid==0 |
| 135 | nfsmount | calling user must be root | S | uid==0 |
| 136 | vmstart | forbidden | H | false |
| 137 | newconsole | | | |
| 138 | st_build | A new thread can only be created (program part running independently) if the number of current process threads is less than a limit and the sum of existing thread stacks increased by that of the thread to be created is less than a limit and the priority is less than the given maximum priority for the process. These limits can only be specified by the root process. | H | threadcnt<maxthread&&totalstack <=pstacklim&&( uid==0 \| newprio<= priolim) |
| 139 | st_resume | | | |
| 140 | st_stop | | | |

TABLE I-continued

APPENDIX

| No. | Call | Required filter or priviledge control | Type | Implementation details |
|---|---|---|---|---|
| 141 | st_join | | | |
| 142 | st_detach | | | |
| 143 | st_exit | | | |
| 144 | _getstid | | | |
| 145 | st_setcancel | | | |
| 146 | st_testcancel | | | |
| 147 | st_cancel | | | |
| 148 | mutex_enter | | | |
| 149 | mutex_exit | | | |
| 150 | cv_wait | | | |
| 151 | cv_signal | | | |
| 152 | cv_broadcast | | | |
| 153 | csem_wait | | | |
| 154 | csem_signal | | | |
| 155 | sigwait | | | |
| 156 | st_sethandle | | | |
| 157 | synch_validate | A process can only have a maximum number of synchronization objects between threads. | H | usynchcnt<=maxu synch |
| 158 | synch_invalidate | | | |
| 159 | st_setkhandle | | | |
| 160 | st_switch | | | |
| 161 | st_setabstimer | | | |
| 162 | fast_setprio | forbidden | S | stub alsys |
| 163 | st_prioresume | forbidden | S | stub alsys |
| 164 | st_stopself | forbidden | S | stub alsys |
| 165 | syslog | forbidden[f] | | |
| 166 | vatopa | same as 165 | | |
| 167 | statfs | | | |
| 168 | fstatfs | | | |
| 169 | profil | forbidden | H | false |
| 170 | vmtopm | forbidden | H | false |
| 171 | mkshm | forbidden | S | stub pshm |
| 172 | shmmap | forbidden | S | stub pshm |
| 173 | shmunmap | forbidden | S | stub pshm |
| 174 | mkmq | forbidden | S | stub pmsg |
| 175 | mqsend | forbidden | S | stub pmsg |
| 176 | mqreceive | forbidden | S | stub pmsg |
| 177 | mqsetattr | forbidden | S | stub pmsg |
| 178 | mqgetattr | forbidden | S | stub pmsg |
| 179 | mqpurge | forbidden | S | stub pmsg |
| 180 | msgalloc | forbidden | S | stub pmsg |
| 181 | msgfree | forbidden | S | stub pmsg |
| 182 | mqput evt | forbidden | S | stub pmsg |
| 183 | mqget evt | forbidden | S | stub pmsg |
| 184 | yield | | | |
| 185 | setscheduler | The scheduling policy can only be modified and the priority can only be increased by the root user. | H | (uid==0) \| ( (newalg== cur_alg) && (newprio<= priolim) ) |
| 186 | getscheduler | | | |
| 187 | setquantum | | | |
| 188 | getquantum | | | |
| 189 | mksem | forbidden | S | stub binsem |
| 190 | semifpost | forbidden | S | stub binsem |
| 191 | sempost | forbidden | S | stub binsem |
| 192 | semifwait | forbidden | S | stub binsem |
| 193 | semwait | forbidden | S | stub binsem |
| 194 | sigaction | | | |
| 195 | sigsuspend | | | |
| 196 | sigprocmask | | | |
| 197 | ekill | forbidden | H | false |
| 198 | memlk | forbidden | S | stub memlk |
| 199 | memunlk | forbidden | S | stub memlk |
| 200 | arequest | forbidden | S | stub arequest |
| 201 | listio | forbidden | S | stub arequest |
| 202 | (none)[g] | forbidden | H | false |
| 203 | await | forbidden | S | stub arequest |
| 204 | acancel | forbidden | S | stub arequest |

TABLE I-continued

APPENDIX

| No. | Call | Required filter or priviledge control | Type | Implementation details |
|---|---|---|---|---|
| 205 | make_event_timer | forbidden | S | stub evtimer |
| 206 | remove_event_timer | forbidden | S | stub evtimer |
| 207 | esigpoll | forbidden | H | false |
| 208 | times | | | |
| 209 | uname | | | |
| 210 | getmsg | forbidden | H | false |
| 211 | putmsg | forbidden | H | false |
| 212 | poll | forbidden | H | false |
| 213 | mqmserver | forbidden[h] | H | false |
| 214 | setsid | | | |
| 215 | setpgid | | | |
| 216 | (none)[i] | forbidden | H | false |
| 217 | fast_stop | forbidden | H | false |
| 218 | fast_stop_th | forbidden | H | false |
| 219 | fast_stop_ti | forbidden | H | false |
| 220 | fast_resume | forbidden | H | false |
| 221 | fast_stop_pi | forbidden | H | false |
| 222 | fast_stop_pi_ti | forbidden | H | false |
| 223 | fast_switch | forbidden | H | false |
| 224 | fast_cancel_timeout | forbidden | H | false |
| 225 | fast_enable_preemption | forbidden | H | false |
| 226 | fast_info_attack | forbidden | H | false |
| 227 | fast_sem_get | forbidden | H | false |
| 228 | fast_sem_wait | forbidden | H | false |
| 229 | fast_sem_signal | forbidden | H | false |
| 230 | fast_sem_delete | forbidden | H | false |
| 231 | fast_sem_twait | forbidden | H | false |
| 232 | fast_csem_set | forbidden | H | false |
| 233 | fast_csem_wait | forbidden | H | false |
| 234 | fast_csem_signal | forbidden | H | false |
| 235 | sigqueue | | | |
| 236 | seek_n_read | forbidden | H | false |
| 237 | seek_n_write | forbidden | H | false |
| 238 | st_name | forbidden | H | false |
| 239 | fast_sem_open | forbidden | H | false |
| 240 | fast_sem_close | forbidden | H | false |
| 241 | fast_sem_unlink | forbidden | H | false |
| 242 | fast_sem_markdelete | forbidden | H | false |
| 243 | fast_sem_unmarkdelete | forbidden | H | false |
| 244 | shm_open | forbidden | H | false |
| 245 | shm_unlink | forbidden | H | false |
| 246 | mmap | forbidden | H | false |
| 247 | munmap | forbidden | H | false |
| 248 | mprotect | forbidden | H | false |
| 249 | msync | forbidden | H | false |
| 250 | clock_gettime | | | |
| 251 | clock_settime | | | |
| 252 | clock_getres | | | |
| 253 | timer_create | forbidden | H | false |
| 254 | timer_delete | forbidden | H | false |
| 255 | timer_getover run | forbidden | H | false |
| 256 | timer_gettime | forbidden | H | false |
| 257 | timer_settime | forbidden | H | false |
| 258 | fdata_sync | | | |
| 259 | (none)[j] | forbidden | H | false |
| 260 | nanosleep | | | |

TABLE I-continued

APPENDIX

| No. | Call | Required filter or priviledge control | Type | Implementation details |
| --- | --- | --- | --- | --- |
| 261 | socket_pair | calling user must be root | S | uid==0 |
| 262 | nsbrk | | | |
| 263 | sigtimedwait | | | |
| 264 | signotify | forbidden | H | false |
| 265 | name_server | forbidden | H | false |
| 266 | adjtime | | | |

GLOSSARY

| | |
| --- | --- |
| ACARS | Aircraft Communication Addressing and Reporting System |
| ADS | Automatic dependent Surveillance |
| AFN | ATC (Air Traffic Control) Facility Notification |
| AOC | Airline Operational Communication |
| ARINC | Aeronautical Radio Incorporated |
| ATIMS | Air traffic and Information Management System |
| ATM | Air traffic Management |
| ATSU | Air Traffic Service Unit |
| BITE | Built in Test Equipment |
| CMC | Central Maintenance Computer |
| CNS | Communication Navigation and Surveillance |
| CPDLC | Controller/Pilot Data Link Communication |
| CPU | Central Process Unit |
| ECAM | Electronic Centralized Aircraft Surveillance |
| EFIS | Electronic Flight Instrument System |
| FANS | Future Air Navigation System |
| FMS | Flight Management System |
| FWS | Flight Warning System |
| HFDL | HF Data Link |
| HMI | Human Machine Interface |
| MCDU | Multipurpose Control and Display Unit |
| MDDU | Multipurpose Disk Drive Unit |
| OS | Operating System |
| SatCom | Satellite Communication |
| VDR | VHF Data Radio |

What is claimed is:

1. A method for implementing an air traffic service unit including an operating system having an input/output management, a hardware resource, and a software resource, comprising the steps of:

managing links between aircraft equipment and a ground/board communication means via the operating system;

chaining an airline operational communication (AOC) application wherein the application performs an aircraft system functionality;

timing the AOC application;

using a memory partitioning mechanism to provide a protection check wherein the protection check determines code access of the AOC application;

using a processing unit partitioning mechanism to assign a job a priority wherein the job priority determines CPU access of the AOC application; and filtering an operating system call from the AOC application to prevent said AOC application from disturbing an operation of said air traffic service unit.

2. The method as recited in claim 1, wherein the filtering the operating system ce includes the HOOK method to provide a procedure during a system call before the system call is processed by the operating system.

3. The method as recited in claim 2, wherein the filtering the operating system call provides an authorized system call access.

4. The method as recited in claim 1, wherein the operating system call includes the following steps:

configuring a filter feature wherein the filter feature is set by means of a "superuser" process included in the air traffic service unit;

filtering a system call to be filtered to determine a system call execution reject;

recording the system call execution reject; and at a demand of the superuser process of the air traffic service unit, supplying a data stored on the system call execution reject.

* * * * *